UNITED STATES PATENT OFFICE.

WINFIELD SCOTT MORRISON, OF OAKLAND, CALIFORNIA.

PROCESS OF PREPARING CONCENTRATED HYDRATED MAGNESIA.

No. 926,280.    Specification of Letters Patent.    Patented June 29, 1909.

Application filed January 5, 1909. Serial No. 470,825.

*To all whom it may concern:*

Be it known that I, WINFIELD S. MORRISON, a citizen of the United States, residing at Oakland, in the county of Alameda and State of California, have invented a new and useful Process of Preparing Concentrated Hydrated Magnesia, of which the following is a specification.

This invention relates to a method of preparing concentrated, hydrated magnesia to adapt it for use as a base for a dentifrice, and, also, the product resulting from the method.

The object of the present invention is to provide a novel form of magnesium hydroxid adapted more particularly for use as a base for a dentifrice, which shall possess the qualities of a mild alkali; which shall be sparingly soluble in a neutral or alkaline liquid, but freely soluble in an acid liquid; which shall be capable of neutralizing acids; which shall be devoid of any substances that tend to engender decay; which shall embody antiseptic, germicidal, preservative and detergent qualities; which shall be an energetic agent for the removal of tartar from the teeth, acting as a solvent for such deposits; and which shall be unctuous, fine grained, and devoid of grittiness either to the touch or the taste.

With the above and other objects in view, as will appear as the nature of the invention is better understood, the same consists, generally stated, in the method of treating magma of magnesia to produce a concentrated magma of magnesium hydroxid, that shall be devoid of any disagreeable taste that would cause it to be objectionable for use as a base for dentifrice, and which shall be smooth and devoid of all crusts or granular lumps which would render it non-applicable for the purpose designed.

The invention consists further in a novel form of concentrated magma of magnesium hydroxid, obtained, generally stated, by treating and subsequently reducing magma of magnesia until the resulting concentrated magma contains not less than 20% of magnesium hydroxid, the product being of plastic consistency, slightly alkaline, completely soluble in weak acids, detergent, and a solvent for deposits of tartar upon the teeth.

Milk of magnesia has been used as a corrective dentifrice for many years, but owing to its somewhat disagreeable taste, it has never become popular. Its value being recognized, but its peculiar flavor rendering it objectionable to most people, various attempts have been made to incorporate a certain proportion of milk of magnesia in tooth pastes, thus disguising it, and rendering it more pleasing to use, while at the same time preserving its medicinal properties. Being a somewhat thin liquid, any considerable percentage added to a tooth paste makes it soft and sloppy. All attempts to overcome this objection, as by adding tragacanth, glycerite of starch, gelatin, or similar substances ordinarily used as thickeners, has proved unavailing, since milk of magnesia is destructive to these substances. The idea then occurred of concentrating the milk of magnesia in such manner as to give it body, and at the same time eliminate the objectionable taste.

After repeated experiments extending over a considerable period of time a satisfactory concentration of the magma of magnesium hydroxid was effected, and which was secured first by placing a soluble salt of magnesium in a tank containing cold water, bringing the water to the boiling point, and retaining it there for a specified period, then precipitating the magnesium as a hydrated oxid by means of a caustic alkali, then alternately agitating, boiling, and settling the product to effect the reduction of the particles of magnesium hydroxid, and at the same time remove all remaining traces of the salt resulting from the chemical reaction, straining, and finally concentrating by drying with frequent agitation to prevent the formation of crusts and granular lumps. The concentrated product thus obtained has a specific gravity of approximately 1.13, and contains about 20% of magnesium hydroxid. This concentrated milk of magnesia has been found to be a little too soft for a dentifrice when used alone, and after repeated tests, it has been found that the best results can be secured by using it in conjunction with magnesium carbonate and precipitated calcium carbonate.

Having the concentrated magma of magnesium hydroxid as a base, the need of such substances as glucose, honey, syrup, glycerite of starch, tragacanth, gelatin, and the like is obviated.

By the proceedure above outlined, it will be seen that there is produced a new base for tooth paste, but more than this has been secured, inasmuch as the product possesses not only the physical properties required in a tooth paste, but, also, those chemical and therapeutical characteristics that render it invaluable as a dentifrice. Heretofore all tooth pastes have been dependent for their plasticity upon a base composed of glucose, honey, glycerin, or syrup, or a mixture of two or more of these substances, and as is evident the presence of one or more of these ingredients accomplishes no useful purpose when brought in contact with the teeth, but on the contrary, especially if the teeth be carious or incrusted with tartar, are positively injurious. The substances above named are used on account of their physical properties only, and not because they possess any detergent, antiseptic, or preservative features.

The concentrated magma of magnesium hydroxid herein described possesses the required plasticity without admixture with syrup, honey, glucose, or any similar substances, and is at all times slightly alkaline, neutralizing immediately any acid that may exist in the mouth whether as the result of tooth decay, or as the result of fermenting food particles between the teeth or around their necks; it is detergent, cleaning the teeth and removing tartar by its chemical solvent action. Milk of magnesia, therefore, concentrated in the manner described, possesses physical, chemical, and physiological properties that render it extremely valuable as a base for paste dentifrice. This base may be combined with many of the ordinary dentifrice ingredients, but the fact must be remembered that hydrated magnesium oxid is incompatible with a number of the substances often employed in the manufacture of paste dentifrice. It is destructive to substances of colloid nature, such as gelatin, albumin, tragacanth, mucilage of Irish moss, mucilage of quince seed, and in fact most substances of organic origin. It destroys many essential oils and flavoring substances, but is, however, perfectly compatible with chalk, carbonate of magnesia, pumice, and many other substances of inorganic origin. It has been found by careful research and experiment that menthol, oil of rose, oil of cassia, and oil of cloves withstand to a remarkable degree the destructive action of concentrated magma of magnesium hydroxid.

The benefit derived from the use of a dentifrice containing concentrated magma of magnesium hydroxid is particularly marked whenever a local acid area exists, as in tooth decay, or as a result of fermenting food particles between the teeth or around their necks, since the locally formed acid is instantly neutralized and the fermentative action checked by the magnesium hydroxid, and, furthermore this ingredient being of an astringent nature hardens the gums and keeps them in a healthy condition.

As an example of how the concentrated magma of magnesium hydroxid of this invention is prepared, the following procedure is given. In carrying the invention into effect, a tank having a capacity of say six hundred gallons is arranged so that its contents may be boiled by the aid of steam. In this tank are placed four hundred pounds of magnesium sulfate and four hundred gallons of pure cold water, and the mass is brought to the boiling point. While boiling, a sufficient quantity of 10% solution of caustic soda is run into the mass and operates entirely to precipitate the magnesium as hydrated oxid. The quantity of the solution of caustic soda required may vary slightly, but generally about one hundred and fifty gallons will be used to the volume of water and magnesium sulfate above set forth. The boiling is continued for two hours, more or less, and the mixture is allowed to settle over night. The next morning the supernatant liquid is withdrawn, the tank is refilled with cold water, and the contents are stirred until the precipitate is thoroughly mixed with the water, is then boiled for two hours, more or less, and allowed to stand as before. This procedure is repeated for six days generally, although it may be continued for eight days or more.

If after the final treatment, be it six days or more, the product is allowed to settle for forty-eight hours, and the supernatant liquid withdrawn, the balance when thoroughly mixed will be found to contain approximately twenty-four grains of magnesium hydroxid in each fluid ounce. It is a liquid of milky appearance which does not settle appreciably upon standing, the particles of magnesium hydroxid remaining in suspension indefinitely. Upon examination under a magnification of 1,000 diameters the particles of magnesium hydroxid appear to touch one another, which probably accounts for their remaining in suspension. Upon extreme dilution the individual particles may be examined and measured, and most of these will be found to measure between 1/5000 and 1/10000 of an inch in diameter, and upon careful examination many of these particles are found to be aggregations of still smaller particles too minute for observation and measurement. To effect further concentration of the milky liquid thus produced, it is poured upon a cloth strainer, and the portion that passes therethrough is repeatedly returned until the liquid runs clear. After draining about six days it will still be found to contain about 50% more water than is desired in the finished concentrate. To eliminate this excess water, the product is removed from the strainers, squeezed through a fine linen strainer and spread out to dry, preferably upon trays in a dry room kept at a temperature of about 100° F. Since any portion becoming entirely dry is useless for the purpose intended, subsequent moistening not restoring it, it needs careful watching during this part of the operation, frequent stirring being necessary to prevent uneven drying. When it is concentrated until the resultant product will yield 20% residue, composed of magnesium hydroxid, when thoroughly dried at 212° F., it will be found to be a substance of plastic consistency, free from lumps or gritty particles, possessing a specific gravity of 1.13, pure water being taken as a unity, 10 C. C. of the concentrated magma weighing 11.3 grams.

It is impossible to obtain a powder from this preparation in which the particles are as fine as they are while in aqueous suspension since in the drying process the particles agglutinate, and, furthermore, subsequent moistening will fail to restore the qualities possessed by the preparation previous to drying.

As above stated, the specific gravity of the concentrated magma is 1.13, and this is the specific gravity of the magma as a whole, and not of the magnesium oxid contained in the magma. The specific gravity is determined by filling and weighing a tared 10 C. C. pipette having a 1/8 inch aperture which admits the thick and plastic magma. Magma of 1.13 specific gravity contains 20.40 per cent. residue when dried over a water bath. As it is next to impossible to obtain a perfectly homogeneous mass in a preparation of this kind, the above figures should be taken as being approximate only as regards the entire mass. It is exceedingly difficult to make anything more than a general statement as to the exact composition of the magma, especially since the physical appearance of the mass has much to do with the amount of concentration necessary. The more faithful the manipulation, the more bulky and plastic the product, and when carefully prepared and thoroughly mixed after removal from the drying trays it will be found to agree with the statements above made.

It might appear as though the above outline procedure is cumbersome and unnecessary, but upon investigation it will be seen that there is an object in every step of the process. To begin with, the diluted solutions employed when precipitating the magnesium hydroxid may seem unnecessary, but it is a well known axiom, that the more dilute the solution the finer the precipitate. Furthermore, when a dilute solution is employed the supernatant liquid is proportionately greater, and upon drawing this off we get rid of the bulk of the sulfate of soda resulting from the reaction and held in solution in the water. Upon refilling the tank with cold water, as above stated, the contents are stirred until the precipitate is thoroughly mixed throughout. This accomplishes a double purpose. In the first place it washes out the remaining traces of sodium sulfate, and in the second place it causes the water to become saturated with magnesium oxid, which is about seven times more soluble in cold than in boiling water, and the subsequent heating of the cold solution precipitates the bulk of the dissolved magnesium oxid. Thus with each repeated treatment the hydrated oxid becomes finer and more bulky, and at the end of six days, which is generally the limit of practical benefit derived from this treatment, the substance is then transferred to the draining rack and is finally further concentrated by drying while being agitated to prevent the formation of crusts or granular lumps.

The resultant product is an unctuous mass, moist and plastic, of substantially uniform grain, smooth, free from grittiness, bland and almost tasteless.

What is claimed is:—

1. As an article of manufacture, concentrated magma of magnesium hydroxid, from which all trace of the precipitant has been removed, and which is in the form of an unctuous mass, moist and plastic, of substantially uniform grain and devoid of grittiness, the specific gravity of which is about 1.13, and the individual particles measure from 1/5000 to 1/10,000 of an inch in diameter.

2. In the process of preparing a concentrated magma of magnesium hydroxid, the step which consists in agitating and boiling the magma with a separate portion of water and settling each day for several days.

3. In the process of preparing a concentrated magma of magnesium hydroxid, the step which consists in agitating and boiling the magma with a separate portion of water and settling each day for several days and then straining to remove the surplus water.

4. In the process of preparing a concentrated magma of magnesium hydroxid, the step which consists in agitating and boiling the magma with a separate portion of water and settling each day for several days, then straining to remove the surplus water and finally further concentrating and drying while undergoing agitation.

5. In the process of preparing a concentrated magma of magnesium hydroxid, the step which consists in agitating and boiling the magma with a separate portion of water and settling to effect the reduction of the particles of magnesium hydrate, then straining to remove the surplus water and finally subjecting to a temperature of about 100° F. until sufficiently dry for use, the substance being thoroughly disturbed while drying.

In testimony that I claim the foregoing as my own, I have hereto affixed my signature in the presence of two witnesses.

WINFIELD SCOTT MORRISON.

Witnesses:
　W. W. Worden,
　Geo. C. Browne.